United States Patent [19]

Bourret et al.

[11] Patent Number: 4,464,616

[45] Date of Patent: Aug. 7, 1984

[54] STEPPING MOTOR CONTROLLER

[75] Inventors: Steven C. Bourret; James E. Swansen, both of Los Alamos, N. Mex.

[73] Assignee: The United States of America as represented by the United States Department of Energy, Washington, D.C.

[21] Appl. No.: 394,558

[22] Filed: Jul. 2, 1982

[51] Int. Cl.³ .......................................... H02K 29/04
[52] U.S. Cl. .................................... 318/696; 318/685
[58] Field of Search ................. 250/231 SE; 318/685, 318/696

[56] References Cited

U.S. PATENT DOCUMENTS 3,863,118  1/1975  Lander et al. ...................... 318/685

Primary Examiner—B. Dobeck
Assistant Examiner—Saul M. Bergmann
Attorney, Agent, or Firm—Leonard C. Brenner; Paul D. Gaetjens; Michael F. Esposito

[57] ABSTRACT

A stepping motor is microprocessingly controlled by digital circuitry which monitors the output of a shaft encoder adjustably secured to the stepping motor and generates a subsequent stepping pulse only after the preceding step has occurred and a fixed delay has expired. The fixed delay is variable on a real-time basis to provide for smooth and controlled deceleration.

16 Claims, 6 Drawing Figures

STEPPING MOTOR CONTROLLER

BACKGROUND OF THE INVENTION

This invention is the result of a contract with the Department of Energy (Contract No. W-7405-ENG-36). The present invention relates generally to stepping motor control systems and more particularly to digitally processing based stepping motor control systems.

In a stepping motor environment involving relatively heavy loads and requirements for rapid acceleration and controlled deceleration, the stepping motor response characteristics vary with inertia, loading, and other functional parameters. To achieve maximum speed and acceleration under such conditions present the control system with problems in achieving and maintaining synchronization. Some control systems operate stepping motors at less than optimum speed and acceleration in order to reserve a "margin of safety" in maintaining synchronization between the control system and the stepping motor.

It is therefore an object of the present invention to provide a stepping motor control system to achieve maximum acceleration and speed from a stepping motor under varying loading parameters while maintaining synchronization.

It is another object of the present invention to provide a microprocessor based stepping motor controller for readily obtaining rapid acceleration, maximum speed, and controlled deceleration of a stepping motor while maintaining synchronization thereof.

To achieve the foregoing and other objects, and in accordance with the purposes of the present invention, as embodied and broadly described herein, the apparatus of this invention may comprise a stepping motor having an output shaft coupled to a load and adjustably coupled to an encoder having two outputs offset 90° therebetween and digital processing circuitry responsive to the two outputs of the encoder for providing pulses to the stepping motor at a rate and timing such as to maintain synchronization therewith during rapid acceleration, constant speed, and controlled deceleration. Microprocessing subroutines provide for the generation of a subsequent stepping motor pulse upon verification of completion of the immediate preceding step and the expiration of a predetermined delay period.

One advantage of the present invention is that maximum stepping motor acceleration and speed can be obtained while maintaining synchronization therewith.

Another advantage of the present invention is that real time variation of the predetermined delay time can be readily incorporated into the microprocessing subroutine to provide a smooth controlled deceleration.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate the embodiment(s) of the present invention and, together with the description, serve to explain the principles of the invention. In the drawings.

DETAILED DESCRIPTION OF THE PREFERRED EMBODIMENT

Figure 1:
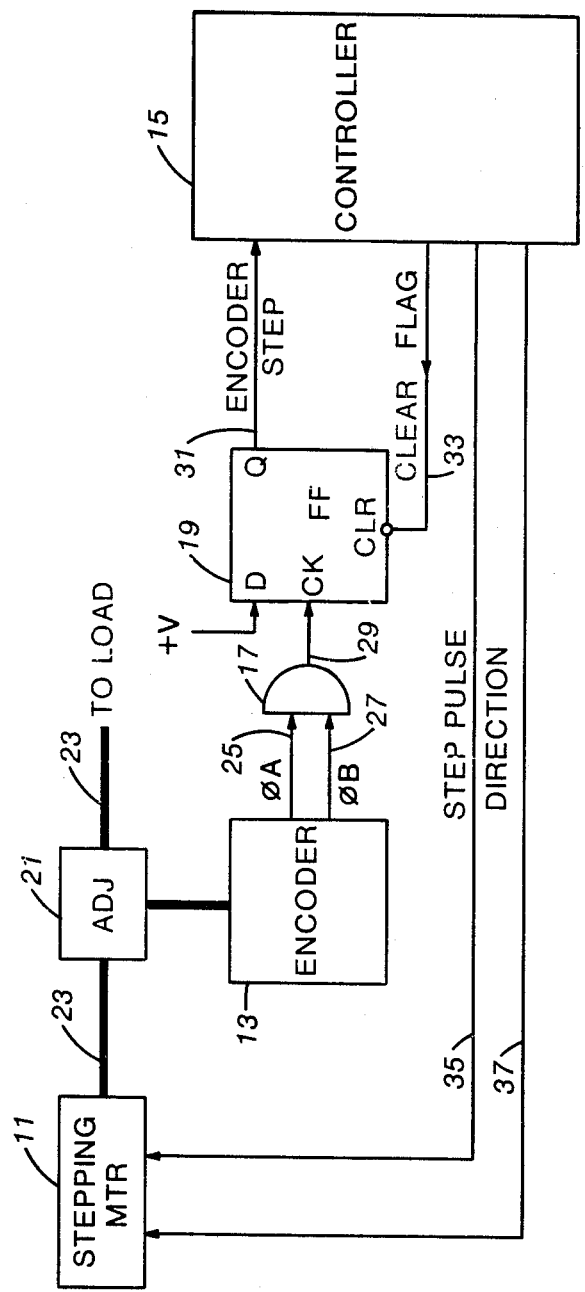
FIG. 1 is a diagram of a preferred stepping motor embodiment of the present invention.

With reference to FIG. 1 the present invention comprises three basic elements, a stepping motor 11 an encoder 13 and a controller 15 which may be a microprocessor. Other elements used in the invention as shown in FIG. 1 is an AND Gate 17, a D flip-flop 19, and a mechanical adjusting element 21 which is used to initialize the adjustment of the encoder 13 with reference to the stepping motor 11. The stepping motor has a mechanical output shaft 23 which feeds through the adjustment mechanism 21 to a load not shown in FIG. 1. The encoder 13 is mechanically positioned and secured through the adjustment mechanism 21 to the stepping motor output shaft 23. The encoder 13 outputs two pulses, phase A on phase A line 25 and phase B on phase B line 27. Phase B is 90° shifted with reference to phase A. The phase A line 25 and the phase B line 27 feed as inputs a two input AND gate 17 having output line 29. Line 29 is provided as the clock input of the D-type flip-flop 19. The D input of flip-flop 19 is connected to a positive voltage source +V. The Q output of the D flip-flop 19 is provided on line 31 and connects a signal representing the encoder step to the controller 15.

As will be detailed hereinafter the controller 15 generates a signal on clear line 33 connected to the clear input of flip-flop 19. The controller 15 also generates on line 35 a step pulse which steps the stepping motor 11 and on line 37 a direction signal which directs stepping motor 11 as to its forward and reverse directions.

Figure 2:
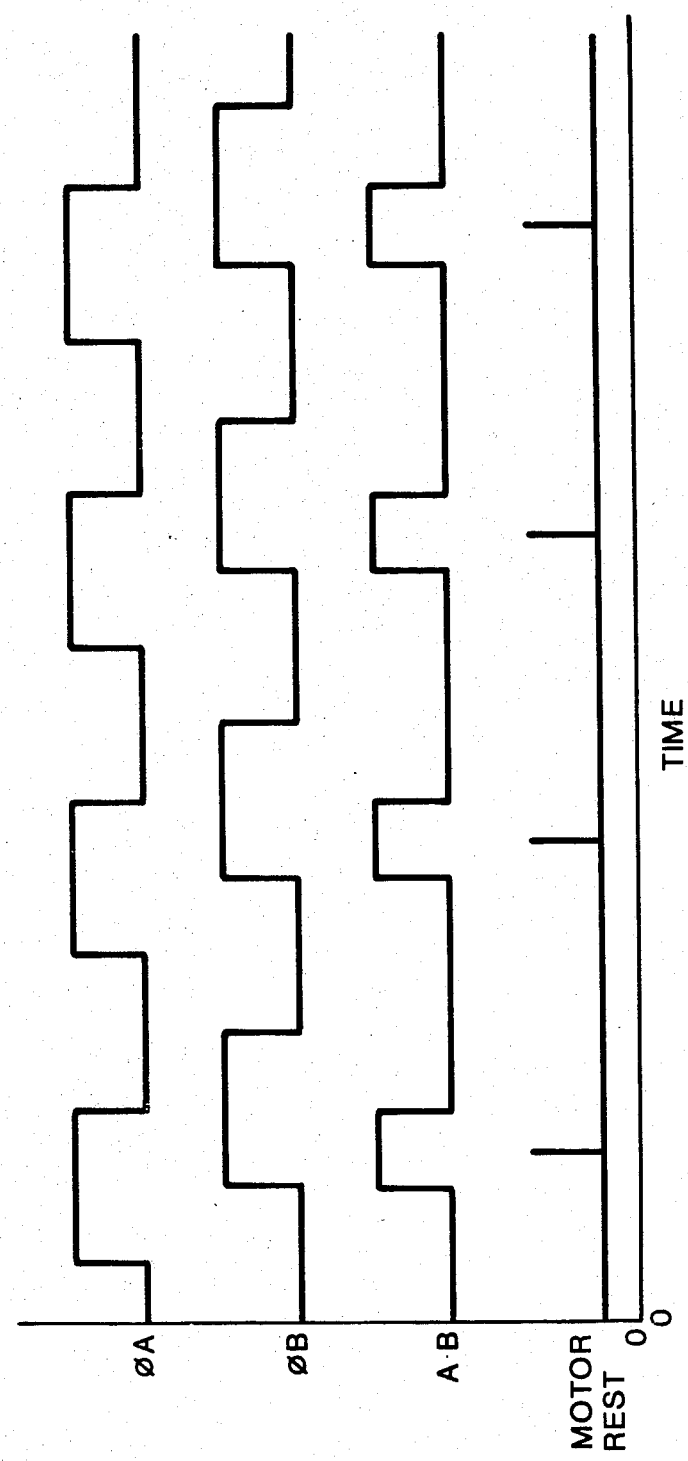
FIG. 2 is a timing diagram illustrating the outputs of an encoder used in FIG. 1 and shown in reference to the rest position of a stepping motor also shown in FIG. 1.

FIG. 2 represents the output phase A and phase B of the encoder 13 with reference to the rest position of stepping motor 11. Phase B is 90° shifted from phase A and the summed output of phase A and phase B as appearing on line 29 of AND gate 17 is positive only when both phase A and phase B are positive. As can be seen the summed phase A and phase B pulse is centered around the motor rest position of stepping motor 11. Thus it is clear that the encoder 13 must generate a phase A pulse and also a phase B pulse for every positional step of stepping motor 11.

The mechanical adjustment mechanism 21 is used to position the encoder 13 on the stepper motor 11 output shaft 23. The mechanical adjustment mechanism 21 needs merely to be a finely locked screw adjustment on the stepping motor 11 output shaft 23. With an oscilloscope (not shown) on the AND gate 17 output 29 one can adjust the encoder 13 with the mechanical adjustment mechanism 21 by minutely rotating the encoder back and forth on the shaft 23 until the rising and falling edge of the pulse on line 29 are determined and by moving the adjustment to the middle of that occurrence and tightening the mechanical adjustment mechanism thereto.

Figure 3:
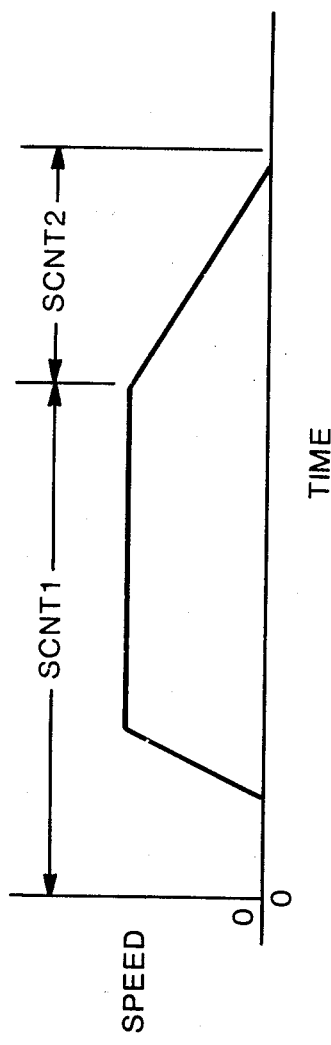
FIG. 3 is a diagram showing the stepping motor increasing, maintaining, and decreasing speed in accord with the present invention.

With reference to FIG. 3, it can be appreciated that the present invention can bring the stepping motor 11 up to speed quickly and maintain that speed for a period, designated SCNT1 and then slowly decrease the speed back to 0 or a base speed in a period designated SCNT2. In FIG. 1 there is shown a controller 15. The controller is presumed to include a clock or other time base from which a counter can count off arbitrary lengths of time. Thus, SCNT1 represents the period for which it is desired that the motor come up and maintain maximum or desired speed and SCNT2 is the period in which it is desired that the stepping motor 11 slowly return to a 0 or base speed rotation.

Figure 4:
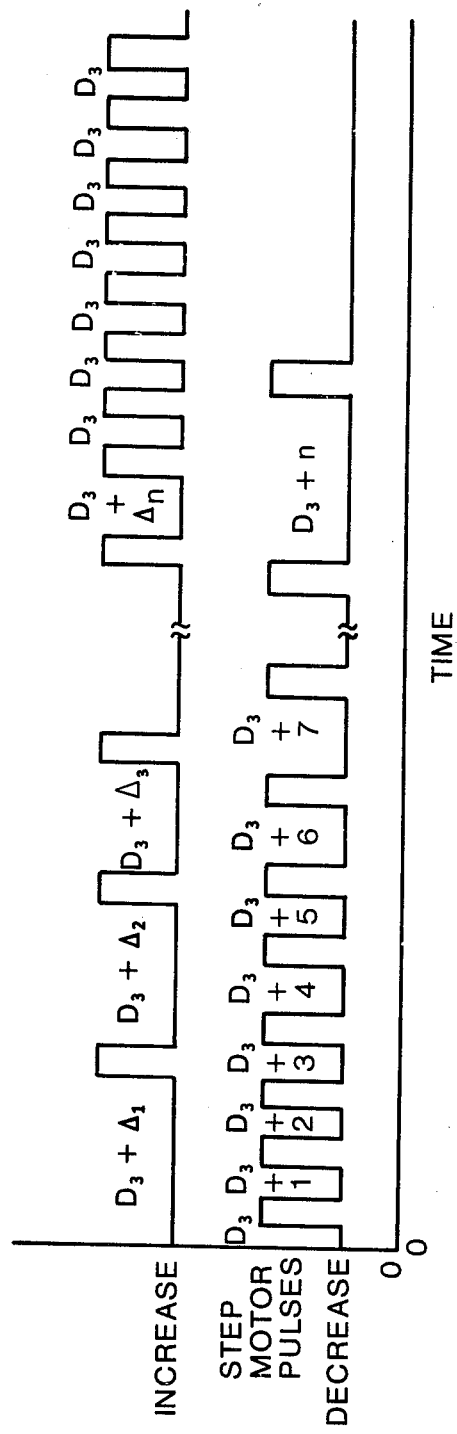
FIG. 4 is a timing diagram showing the outputting pulses of the controller shown in FIG. 1 as employed to increase and decrease the stepping motor speed.

The actual process of increasing, maintaining and decreasing speed by the controller 15 is illustrated in FIG. 4. A specific delay between stepping motor pulses outputted on line 35 to the stepping motor 11 is designated $D_3$. Thus when the stepping motor 11 is driven at a constant rate of output step pulses on line 35 having a period of $D_3$ between pulses, the stepping motor 11 is running at a constant speed. However, because of inertia and load it may be that the stepping motor 11 cannot reach its desired speed instantaneously. Thus, as shown in FIG. 4, that when the speed increase begins there is a period $D_3+\Delta 1$ where $\Delta 1$ is a delay caused by inertia, loading and other such parameters. $\Delta 1$ decreases smoothly to $\Delta 2$ and $\Delta 3$ and so on to $\Delta n$ to the point where it is no longer affecting the speed of the stepping motor 11 but the stepping motor 11 is driven at a constant speed of $D_3$ between pulses. To slow the motor down the period $D_3$ between pulses is incremented by one or more for every output step pulse on line 35. Thus the period between pulses in a decreasing mode begins with $D_3$ and increases incrementally to $D_3+1$, $D_3+2$ and so on up to the point $D_3+n$ at which time the period SCNT2 has elapsed and the motor is stopped.

Figures 5, 6:
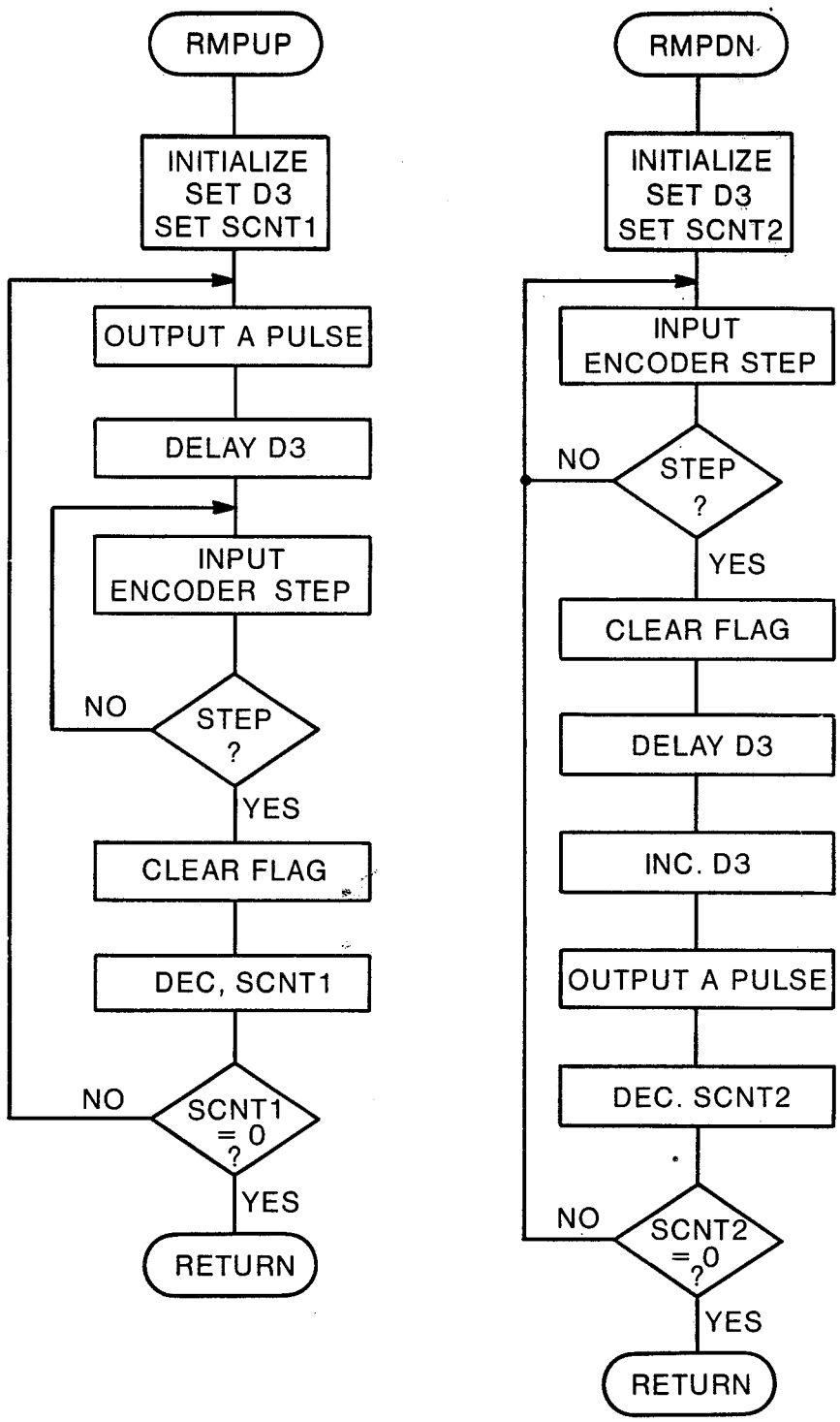
FIG. 5 is a flow diagram of a procedure to increase stepping motor speed by the controller of FIG. 1.
FIG. 6 is a flow diagram of a subroutine to decrease stepping motor speed by the controller of FIG. 1.

The sequence of the events for increasing the speed of stepping motor 11 by the controller 15 is shown in FIG. 5. In FIG. 5, it can be appreciated that the microprocessing controller 15 begins a subroutine (which may be called RMPUP) by initially setting the period D3 which determines the speed at which it is desired that the stepping motor 11 run and the time period SCNT1 for which it is to maintain that speed. SCNT1 represents a period of time and may be determined merely by setting a counter to a certain number of counts which when decremented to zero would take the amount of time for which it is desired that the stepping motor 11 maintain constant speed. Once initialization has occurred an output pulse is generated on line 35 which pulses the stepping motor 11 one increment period. Then a delay of D3 is initiated which may again be a clocking mechanism or some other timing mechanism within controller 15 as is well known by those skilled in the art. After the delay of D3 the line 31 is examined to see if the encoder 13 has generated a pulse on it through flip-flop 19 so as to indicate that a step has occurred. If a step has not occurred then the line 31 is continually examined until such a step occurs. When such a step occurs the clear flag signal is sent on line 33 to clear flip-flop 19, see FIG. 1. Again returning to FIG. 5 after the clear flag is generated the counter SCNT1 is decremented by a count of 1 and the counter then is compared to see as to whether it is equal to zero or not indicating that the time for constant running has elapsed. If it has not, the subroutine repeats the above described sequence. Once the counter SCNT1 is decremented to 0 the subroutine is through and the microprocessor controller 15 begins whatever process or control is determined next.

Frequently, following the conclusion of SCNT1 it is desired to slowly ramp down the stepping motor 11 and therefore the controller 15 switches to a subroutine which may be called RMPDN to begin such a process, see FIG. 6. RMPDN begins with normal housekeeping processes such as initialization and the setting of D3 and the setting of SCNT2 which is another counter or at least another count to determine the length of time required or desired to ramp down the stepping motor 11. The sequence for the ramp down subroutine by the controller 15 begins by examining the input line 31 for an indication of an encoder step. If such a step is not found the process continues to look for the step until it occurs. Once an encoder step has been indicated the clear flag 33 is generated to clear flip-flop 19 and a delay of D3 is initiated along with an incrementing, normally by 1, of the period D3. In this routine D3 is determined by a counter which requires a period of D3 to cycle and by incrementing it by 1 the period is slightly increased. Following the completion of a D3 cycle a pulse is outputted on step pulse line 35 to the stepping motor 11 to generate another stepping position and the counter SCNT2 is decremented by 1. This process is continued until the counter SCNT2 is decremented to 0 and the process is concluded with a return of the subroutine to whatever process next the controller 15 is programmed to initiate. At this point the stepping motor has slowly been reduced in speed to zero.

With reference again to FIG. 1, it is appreciated that a variety of "off-the-shelf" stepping motors may be used to implement the stepping motor 11. Sigma Corporation and other companies manufacture such motors. Preferably the motor is one of high quality and may have as many as 200 steps per revolution. Likewise the encoder 13 may be implemented by number of standard such devices as long as the device chosen has two outputs, phase A and shifted 90°, phase B. Such encoders are made by a variety of companies including Trump-Ros. Preferably the encoder 13 has an identical number of pulses per revolution on phase A and phase B as does the stepping motor 11. Thus if the stepping motor 11 has 200 pulses per revolution, preferably the encoder has likewise. The encoder 13 is fastened directly to the motor shaft 23 and is adjusted thereto by an adjustment mechanism 21 which permits a tuning of the motor rest position with reference to the output of AND gate 17 which is a summary of phase A and phase B of encoder 13.

The AND gate 17 and D-type flip-flop 19 may be implemented in TTL or other suitable standard logic. The type of logic chosen will depend on the specific implementation of encoder 13 and controller 15.

The controller 15 is needed to perform the simple sequence of steps in logic described above and may be implemented by any standard microprocessor or dedicated logic having preferably an internal clock to permit the generation of D3, SCNT1, and SCNT2. Further, although not described above the controller 15 also outputs a signal level indicating to the stepping motor 11 which direction, forward or reverse, it is to run. Alternatively the direction line 37 may be manually controlled or controlled by a device not shown other than controller 15, if so desired in a particular application. The controller 15 may be implemented using simple and standard logic and microprocessing chips such as the Motorola MC 6801 or a variety of other such commonly available microprocessors.

The foregoing description of the preferred embodiment(s) of the invention have been presented for purposes of illustration and description. It is not intended to be exhaustive or to limit the invention to the precise form disclosed, and obviously many modifications and variations are possible in light of the above teaching. The embodiment(s) were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A stepping motor system comprising:
a stepping motor rotatively responsive to a stepping pulse, said stepping motor having a rotatable output shaft with a plurality of rest positions;
a shaft encoder adjustably secured to said rotatable output shaft of said stepping motor, said shaft encoder generating for each rest position thereof first and second overlapping output pulses, said shaft encoder having a first and second output line for outputting respectively thereupon said first and second overlapping pulses;
pulse means combining said first and second overlapping output pulses for generating a single encoder pulse therefrom, said pulse means having a two-input logic AND gate having one input connected to said first and the other input thereof connected to said second output line of said shaft encoder; and
processing means connected to said pulse means and receiving said single encoder pulse generated thereby for adding a delay thereto and thereafter for generating a stepping pulse for said stepping motor.

2. The invention according to claim 1 wherein said shaft encoder is adjustably secured to said rotatable output shaft such that the overlapping of each said first and second overlapping output pulses is centered about an individual rest position of said rotatable output shaft.

3. The invention of claim 1 wherein said delay added by said processing means is a variable delay;

4. The invention of claim 3 wherein said variable delay is a real-time variable delay.

5. The invention of claim 1 wherein said processing means includes a microprocessor and said delay is generated in a subroutine of said microprocessor.

6. The invention of claim 5 wherein said delay is incremented during each pass through a reiterative loop within said subroutine.

7. The invention of claim 5 wherein said subroutine further generates said stepping pulse for said stepping motor.

8. The invention of claim 1 wherein said processing means includes a microprocessor and said stepping pulse is generated in a subroutine of said microprocessor.

9. A stepping motor system comprising:
a stepping motor rotatively responsive to a stepping pulse, said stepping motor having a rotatable output shaft with a plurality of rest positions;
a shaft encoder adjustably secured to said rotatable output shaft of said stepping motor, said shaft encoder generating for each rest position thereof a first and second overlapping output pulses, said shaft encoder having a first and second output line for outputting respectively thereupon said first and second overlapping pulses;
a two-input logic AND gate having one input connected to said first and the other input thereof connected to said second output line of said shaft encoder;
a D-type flip-flop having clock and clear inputs and a Q output, said clock input thereof connected to the output of said two-input logic AND gate; and
controller means connected to said Q output and said clear input of said D-type type flip-flop for clearing said D-type flip-flop after a level shift occurs on said Q output, for adding a delay period upon occurrence of said level shift and thereafter for generating a stepping pulse for said stepping motor.

10. The invention according to claim 9 wherein said shaft encoder is adjustably secured to said rotatable output shaft such that the overlapping of each said first and second overlapping output pulses is centered about an individual rest position of said rotatable output shaft.

11. The invention of claim 9 wherein said delay period added by said controller means is a variable delay period.

12. The invention of claim 11 wherein said variable delay period is a real-time variable delay period.

13. The invention of claim 9 wherein said controller means includes a microprocessor and said delay period is generated in a subroutine of said microprocessor.

14. The invention of claim 13 wherein said delay period is incremented during each pass through a reiterative loop within said subroutine.

15. The invention of claim 13 wherein said subroutine further generates said stepping pulse for said stepping motor.

16. The invention of claim 9 wherein said controller means includes a microprocessor and said stepping pulse is generated in a subroutine of said microprocessor.

* * * * *